E. S. GARDINER.
DEVICE FOR SUPPORTING VARIOUS ARTICLES.
APPLICATION FILED SEPT. 29, 1921.
1,418,435. Patented June 6, 1922.
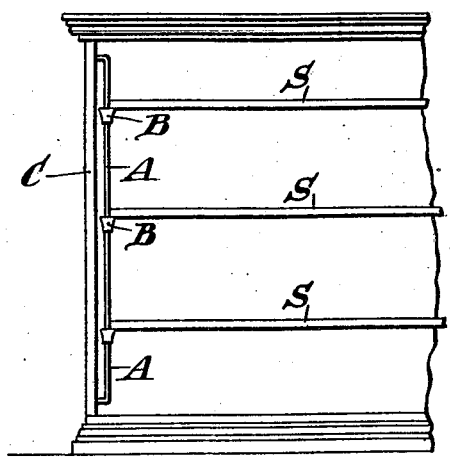
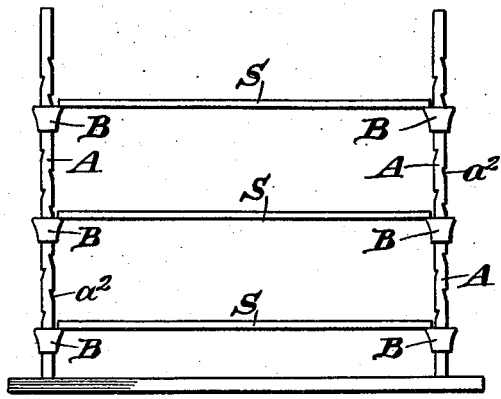
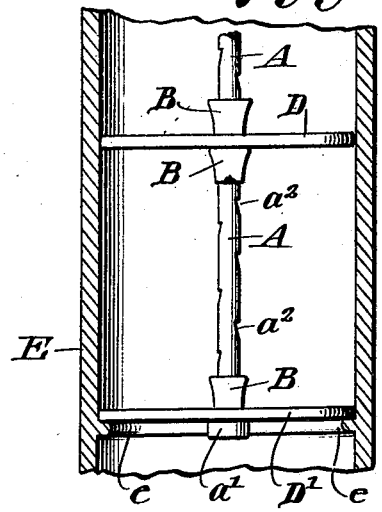
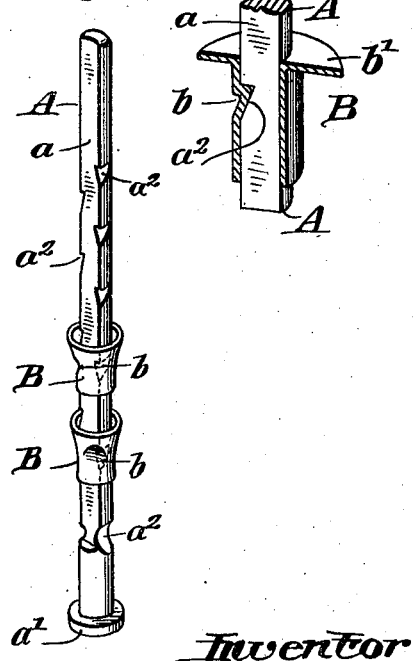
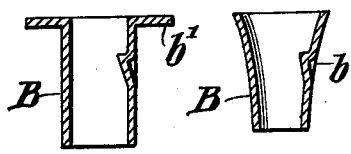
Inventor
Edwin Samuel Gardiner
by his Attorneys
Baldwin Wight

UNITED STATES PATENT OFFICE.

EDWIN S. GARDINER, OF NEW ORLEANS, LOUISIANA.

DEVICE FOR SUPPORTING VARIOUS ARTICLES.

1,418,435. Specification of Letters Patent. Patented June 6, 1922.

Application filed September 29, 1921. Serial No. 504,204.

*To all whom it may concern:*

Be it known that I, EDWIN S. GARDINER, a citizen of the United States, residing in New Orleans, in the parish of Orleans and State of Louisiana, have invented certain new and useful Improvements in Devices for Supporting Various Articles, of which the following is a specification.

This invention relates to devices for holding, supporting or fastening objects or articles of various kinds, the device being especially intended to take the place of nuts engaging threaded rods or the like, the object of the invention being to provide devices which may be more quickly operated than nuts or other similar devices.

According to my invention I provide a rod which is of general cylindrical shape in cross-section, except that it has a flat side extending longitudinally of it, this flat side being straight and uninterrupted from end to end. The rod is formed with one or more notches or teeth adjacent one edge or both edges of the flat side and the rod carries a slide which is formed with a tooth which, when opposite the flat side of the rod, permits the slide to move freely and quickly back and forth on the rod, but when the slide is given a partial turn on the rod the tooth may be made to engage the notch or any one of the notches thereon in such manner as to lock the slide to the rod and when the slide is thus locked on the rod it may serve to support or hold in place the article with which it is associated.

In the accompanying drawings I have shown a few ways of applying my invention, but it will be understood that there are a multiplicity of ways in which they can be used.

Figure 1 is an elevation of part of a bookcase showing how the shelves may be supported by my improved supporting devices;

Figure 2 is a similar view showing how the shelves may be supported at opposite ends by these devices;

Figure 3 indicates how discs or plates may be threaded on a rod within a receptacle and held in place thereon in such manner that they may be quickly detached therefrom;

Figure 4 is a perspective view showing the rod constructed in accordance with my invention with slides thereon;

Figure 5 is a detail sectional view showing one form of slide that may be used;

Figure 6 is a similar view of a slightly modified form of slide;

Figure 7 is a sectional detail view showing how the toothed slide engages the notched rod.

Referring first to Fig. 4, it will be observed that the rod A has a general cylindrical shape or is circular in cross-section, except that it has a flat side $a$, which extends from one end of the rod towards the other. In the particular construction shown, one end of the rod is formed with a flange at $a'$, although this is not essential. Near the edge of the flat side $a$ there is a notch $a^2$. A series of such notches may be used as indicated and there may be notches on each side of the flat side $a$. The flat side $a$ is preferably less than half the diameter of the rod and that portion of the rod beyond the flat side $a$ should be circular or cylindrical, as shown. The slide B is in the form of a sleeve. It has a bore, which is of approximately the same diameter as the rod A, and it is formed with a tooth $b$, which is adapted to slide freely longitudinally along the flat side $a$, but if the sleeve or slide is given a partial turn the tooth $b$ will be made to engage a notch $a^2$ in the rod and thereafter the slide is held firmly in place. As shown in Fig. 5, the slide is formed at the top with a flange $b'$ to provide an extended bearing surface. In Fig. 6 the upper portion of the slide is flared or extended to form such a bearing surface. Fig. 7 shows a top flange $b'$, similar to that shown in Fig. 5, the tooth $b$ being of slightly different shape.

It is important to note that not only does the tooth $b$ engage closely in a notch $a^2$ as shown, for example, in Figure 7, and thus prevent either upward or downward movement of the slide relative to the rod, but the tooth also contacts with the flat side of the rod when moved free of the notches, thus preventing any wabbling of the slide in its movements. In other words, the tooth fills out the part of the circle that has been cut away to form the notches or to form the flat side when it is in engagement with either one or the other.

It is apparent that the devices just described may be used in a great many different connections. They may be said to be capable of universal application and they are largely intended to take the place of bolts and nuts of the kind usually employed.

I have merely illustrated some simple ways of using the device. In Fig. 1 a rod A is shown supported in a case C. This rod A carries slides B. The rod A and slides B are constructed like those shown in Fig. 4, and it will be understood that these slides may be moved to any desired position on the rod, then turned and locked to the rod in the manner before described. Fig. 2 more clearly illustrates how shelves may be supported at opposite ends in a case or otherwise. The notched rods are indicated at A and the slides at B, while shelves are indicated at S. In Fig. 3 I have shown another way of applying the invention. In this case the notched rod A carries slides B, between which is held a plate D. The slides may be moved to any desired position on the rod, then turned and locked in such manner as to securely hold the plate in place on the rod. At its lower end the rod A is shown connected by slide B with another plate D', which plate rests on a ledge e in a container E.

I claim as my invention:

1. A supporting device comprising a rod cylindrical in shape except for a longitudinal cut away portion on one side, one or more notches in the curved portion communicating with the cut away portion, and a slide closely engaging the curved portion of the rod and having a tooth which permits free longitudinal movement of the slide when adjacent the cut away portion, but which fits closely in a notch when the slide is given a movement of rotation.

2. A supporting device comprising a D-shaped rod, one or more notches in the curved portion thereof adjacent the flat side, and a slide surrounding the rod and closely engaging the curved portion thereof and having a tooth which permits free longitudinal movement of the slide when adjacent the flat portion, but which fits closely in a notch when the slide is given a partial turn.

3. A supporting device comprising a cylindrical rod with a flat cut away portion on one side and having one or more notches in the curved portion communicating with the cut away portion, and a slide closely engaging the curved portion of the rod, and having a tooth which fills a notch when moved into the same, and engages the flat surface when moved opposite thereto.

In testimony whereof, I have hereunto subscribed my name.

EDWIN S. GARDINER.